April 18, 1961        M. BRUMA        2,980,787
MACHINING DEVICES MAKING USE OF INTERMITTENT
ELECTRICAL DISCHARGES
Filed June 7, 1960
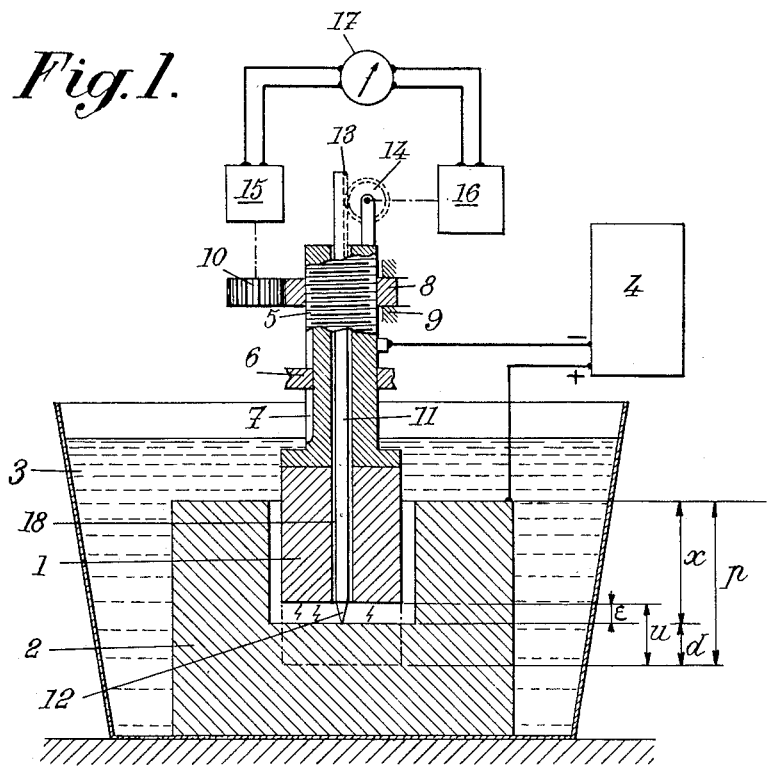
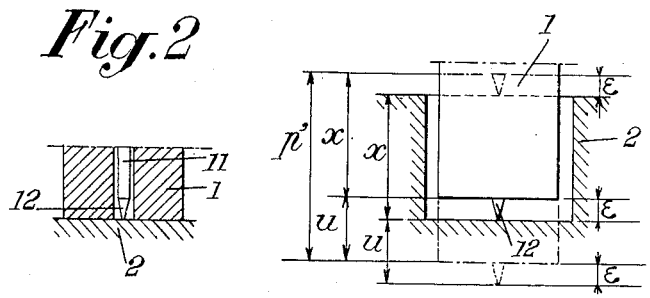
INVENTOR
Marc Bruma
BY
Bailey, Stephens & Huettig
ATTORNEYS

United States Patent Office 2,980,787
Patented Apr. 18, 1961

2,980,787

MACHINING DEVICES MAKING USE OF INTERMITTENT ELECTRICAL DISCHARGES

Marc Bruma, Sceaux, France, assignor to Centre National de la Recherche Scientifique, Paris, France, a French society Filed June 7, 1960, Ser. No. 34,463

Claims priority, application France June 11, 1959

6 Claims. (Cl. 219—69)

The present invention relates to intermittent electrical discharge machining devices, that is to say to devices making use of the electrical erosion phenomenon to machine pieces made of conductor metals or alloys, by producing localized intermittent electrical discharges between the workpiece forming one electrode and another one acting as a machining tool and made of a conductor metal or alloy, the hardness of which may be lower than that of the material of the workpiece.

The chief object of my invention is to provide a device of this kind which is capable of supplying at any time an indication concerning the depth of the hole formed by the tool in the workpiece.

For this purpose, the device according to my invention comprises a follower slidable in the tool in the direction of displacement thereof and adapted to bear against the bottom of the hole formed by the tool in the workpiece, means being provided for determining the sliding displacement of said follower with respect to the tool, that is to say the wear of the tool.

A preferred embodiment of my invention will be hereinafter described with reference to the accompanying drawings given merely by way of example and in which:

Fig. 1 diagrammatically shows in vertical cross section a device made according to the invention.

Fig. 2 is a part view showing the positions of the elements of the device at the beginning of the machining operation.

Fig. 3 is a view similar to Fig. 2 relating to a modification.

The machining device shown by the drawings comprises a tool 1 and a workpiece 2 immersed in a suitable fluid 3, said tool and said workpiece forming electrodes connected respectively to the negative and positive terminals of a source 4 capable of producing intermittent electrical discharges. Every discharge between the electrodes causes material particles to be torn away from each of them and, with a suitable adjustment of the gap between the tool and the workpiece as the operation is proceeding, it is possible to form in the workpiece a hole of a shape corresponding to that of the external surface of the tool.

Adjustment of the gap is obtained by making use of a tool displacement system such for instance as that described in the British Patent No. 800,450, entitled "Improvements in spark machining apparatus" in the name of Centre National de la Recherche Scientifique Francais.

Of course, the quality of machining depends upon the wear undergone by the tool. This wear may be important and may for instance be as high as 40% of the volume of the workpiece.

Furthermore, it may vary during the machining operation in accordance to variations of the temperature and/or of electrical and physical-chemical factors liable to vary during the discharges. It is therefore difficult to determine during the operation the true depth of the hole formed in the workpiece.

As a rule, this depth is measured approximately by reference to the displacement of the tool, this displacement being multiplied by a given reduction coefficient. But such a determination is generally insufficiently accurate and it is necessary to withdraw the tool from the workpiece several times during a machining operation so as directly to measure the depth of the hole.

The object of the present invention is to avoid this drawback.

On Fig. 1 I have indicated the following quantities:

$x$ the depth of the hole formed in workpiece 2, which depth is to be measured;

$u$ the wear undergone by the tool between the beginning of the operation and the time of measurement (the position that would be occupied by the tool if there was no wear being shown in dot-and-dash lines on Fig. 1);

$p$ the displacement of tool 1 between the time where it begins to act upon the workpiece and the time of measurement (the tool may be replaced several times during one machining operation so as to compensate for its wear); and $e$ the gap between the electrodes.

It will be seen that:

$$x = p - (u - e)$$

In order to determine $x$, it is necessary to determine two quantities to wit, $p$ and $u-e$, and to subtract the second one from the first one.

To determine $p$, I make use of means including the following elements:

A screw 5 rigid or integral with tool 1 and prevented from rotating with respect to the frame of the device (and therefore to workpiece 2) by a finger 6 carried by said frame and engaged in a longitudinal groove or slot 7 provided in the screw, and A nut 8 screwed on screw 5 and prevented from moving longitudinally by abutments 9, this nut being rotated through means such as disclosed by the above mentioned British patent.

The angular position of nut 8 is in relation to the depth to which tool 1 has been driven into workpiece 2. In other words, $p$ is determined by the angular position of nut 8 and of a pinion 10 in mesh with this nut. In order to determine the value of $u-e$, tool 1 is fitted with a follower 11, the lower end 11 of which is applied, during the machining operation, against the bottom of the hole formed in the workpiece.

Tool 1 carries means for determining the relative position of follower 11 with respect to said tool 1. Such means comprise for instance a rotary member journalled about an axis fixed with respect to the tool and rotatable in response to the sliding displacements of follower 11 with respect to tool 1. In the construction illustrated by the drawing, a rack 13 integral with follower 11 meshes with a pinion 14 rotatably carried by the tool.

If the measurements are made from the initial positions occupied by the parts or elements of the device when tool 1 is applied against workpiece 2 just before the beginning of the machining operation, as shown by Fig. 2, the angular displacements from these initial positions of pinions 10 and 14 are respectively proportional to quantities $p$ and $u-e$.

If it is supposed that the proportional coefficients between the angular displacements and the rectilinear displacements that correspond thereto are equal for both of these pinions (which is easy to obtain) it suffices to transmit the two above mentioned angular displacements, for instance through synchro-transmitters (Selsyn) 15 and 16, to respective indicator means of any suitable type well known in the art. But preferably both of these displacements are transmitted to a single differential indicator on which may be read the value of the difference $p-(u-\epsilon)$ that is to say the value of the depth $x$ to be measured.

Follower 11 may be a needle housed in one of the passages 18 (of a diameter averaging 2 mm.) usually provided in tool 1 for the circulation of oil serving to evacuate the particles resulting from erosion.

The end 12 of this needle is pointed so that the area of contact of the workpiece with the follower is small and does not prevent a homogeneous machining.

Needle 11, or at least the point 12 thereof, must of course be made of a material which is not an electricity conductor so as to avoid short-circuiting the electric discharges. It must also be capable of resisting corrosion from the oils with which it is in contact and sufficiently hard to have no deformation when in contact with the workpiece. For this purpose, it is made for instance of diamond, sapphire, quartz or one of the platsic materials desginated by the trademarks: Plexiglas, Rilsan.

Of course, any suitable resilient means may be provided to apply point 12 against the bottom of the hole formed in the workpiece. The follower may be applied against the workpiece only intermittently, the indication given on the scale of apparatus 17 corresponding, in this case, to the depth to be measured only when the follower is in contact with the workpiece. By proceeding in this way, the wear point 12 is greatly reduced. Any suitable means, such as a circulation of fluid under pressure along the needle, may be provided to prevent risks of seizing thereof in the passage provided in the tool.

As a rule, the quantity $\epsilon$ (of the order of magnitude of the tenth of a millimeter) may be neglected in comparison to the other magnitudes. It is therefore possible, without introducing any material error, to take as initial positions of the elements of the device, those occupied by them on Fig. 2.

It is also possible to take, as initial positions of the elements, those occupied by them at the beginning of the machining operation, that is to say when the tool is separated from the workpiece by a space corresponding to the thickness $\epsilon$ of the gap, as shown in dotted line by Fig. 3. It will be easily understood that the depth $x$ to be measured is equal to the difference between the total displacement $p'$ of the tool (measured from this initial position) and wear $u$ measured by the displacement of point 12 with respect to tool 2.

Of course, apparatus 17 must give a zero indication when the elements are in their initial positions. Therefore, the adjustment is not quite the same as these initial positions are those shown by Fig. 2 or those shown by Fig. 3. But once the adjustment has been made, the indication given by apparatus 17 depends only upon the true depth of machining.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A device for machining by electro-erosion a workpiece made of an electricity conducting material, to form a hole therein, this device comprising in combination a tool forming an electrode movably mounted opposite the workpiece forming another electrode, means connected with said electrodes for generating successive electric discharges between them, said tool electrode being provided with a passage therein parallel to the direction of movement of said tool with respect to said workpiece, a follower slidable in said passage and adapted to bear against the bottom of the hole formed by said tool in said workpiece and remote indicator means operatively connected to said follower and responsive to displacements of said follower with respect to said tool.

2. A device for machining by electro-erosion a workpiece made of an electricity conducting material to form a hole therein, which device comprises, in combination, a frame, a tool forming an electrode movably mounted in said frame opposite the workpiece forming another electrode and fixed in said frame, means connected with said electrodes for generating successive electric discharges between them, said tool being provided with a passage therein parallel to the direction of movement of said tool with respect to said workpiece, a follower slidable in said passage and adapted to bear against the bottom of the hole formed by said tool in said workpiece, a member movably mounted in said frame and operatively connected with said tool to have displacements with respect to said frame proportional to the displacements of said tool with respect to said workpiece and remote indicator means operatively connected both with said follower and said member to be responsive to the difference between the displacements of said member with respect to said frame and the displacements of said follower with respect to said tool.

3. A device according to claim 1 in which said follower consists of a needle at least the point of which is made of a non-conducting material and engaged with a loose fit in a longitudinal passage formed in said tool.

4. A device according to claim 3 in which said needle point is made of a material of the group consisting of diamond, sapphire, plastic materials designated by the trademarks Plexiglas and Rilsan.

5. A device according to claim 1 in which said follower includes a rack integral therewith and extending in the direction of displacement of the tool, further including a pinion carried by said tool and rotatable with respect thereto about an axis perpendicular to said direction, said pinion being in mesh with said rack and means for transmitting the angular displacements of said pinion to said indicator means.

6. A device according to claim 2 including synchrotransmitter devices for transmitting to said indicator means the displacements of said member with respect to said frame and of said follower with respect to said tool.

No references cited.